United States Patent
Su

(10) Patent No.: US 10,766,074 B2
(45) Date of Patent: Sep. 8, 2020

(54) ROTATIONAL CUTTING TOOL FOR TRIMMING WORKPIECE

(71) Applicant: Hong Ann Tool Industries Co., Ltd., Taichung (TW)

(72) Inventor: Cheng-Wei Su, Taichung (TW)

(73) Assignee: Hong Ann Tool Industries Co., Ltd., Taichung (TW)

( * ) Notice: Subject to any disclaimer, the term of this patent is extended or adjusted under 35 U.S.C. 154(b) by 98 days.

(21) Appl. No.: 16/188,631

(22) Filed: Nov. 13, 2018

(65) Prior Publication Data

US 2019/0176236 A1 Jun. 13, 2019

(30) Foreign Application Priority Data

Dec. 7, 2017 (TW) .............................. 106142984 A

(51) Int. Cl.
*B23B 5/16* (2006.01)
*B23G 9/00* (2006.01)
*B23B 51/10* (2006.01)

(52) U.S. Cl.
CPC ............ *B23B 5/167* (2013.01); *B23B 51/103* (2013.01); *B23G 9/003* (2013.01); *B23G 9/009* (2013.01); *B23B 2220/08* (2013.01); *B23G 2240/08* (2013.01); *Y10T 408/89* (2015.01); *Y10T 408/899* (2015.01)

(58) Field of Classification Search
CPC ..... B23B 5/167; B23B 51/101; B23B 51/103; B23B 2220/08; B23G 9/003; B23G 9/009; Y10T 408/89; Y10T 408/893; Y10T 408/899
See application file for complete search history.

(56) References Cited

U.S. PATENT DOCUMENTS

| 2,292,581 | A | * | 8/1942 | Richardson | ............ | B23G 9/004 |
| | | | | | | 408/211 |
| 3,242,526 | A | * | 3/1966 | Wilton | ..................... | F21V 35/00 |
| | | | | | | 408/211 |
| 3,754,832 | A | * | 8/1973 | Stickler | ................... | B23B 5/167 |
| | | | | | | 408/227 |
| 3,875,832 | A | * | 4/1975 | Mayfield | ................. | B23B 5/162 |
| | | | | | | 82/113 |

(Continued)

FOREIGN PATENT DOCUMENTS

| EP | 2532458 A1 * | 12/2012 | ............. | B23B 5/167 |
| FR | 1256805 A * | 3/1961 | ............. | B23B 5/167 |

*Primary Examiner* — Eric A. Gates
(74) *Attorney, Agent, or Firm* — Alan D. Kamrath; Karin L. Williams; Mayer & Williams PC

(57) ABSTRACT

A rotational cutting tool includes a connecting end for engaging with a driving tool and a cutting end for engaging with the work piece. The connecting end and the cutting end rotate about the rotation axis upon rotation of the rotational cutting tool. An inner periphery of the cutting end defines a receiving space for receiving the work piece. The receiving space has a conic surface which extends radially and obliquely with respect to the rotation axis. The receiving space includes a first ridge forming at least one cutting edge for trimming the workpiece and at least one slot allowing trimmed pieces from the workpiece to exit from the receiving space. The first cutting edge extends radially and obliquely with respect to the rotation axis. The first cutting edge extends curvedly and has a curved contour.

19 Claims, 9 Drawing Sheets

(56) References Cited

U.S. PATENT DOCUMENTS

| | | | | |
|---|---|---|---|---|
| 4,205,493 A * | 6/1980 | Kim | ............................ | B24D 7/18 |
| | | | | 408/211 |
| 4,798,109 A * | 1/1989 | Berns | ........................ | B23B 5/163 |
| | | | | 408/80 |
| 4,798,503 A * | 1/1989 | Huju | .......................... | B23B 49/04 |
| | | | | 144/219 |
| 5,961,382 A * | 10/1999 | Stoloski | ................ | B27B 17/0016 |
| | | | | 451/180 |
| 9,821,393 B2 | 11/2017 | Su | | |
| 10,293,410 B2 * | 5/2019 | Yu | ............................. | B23B 5/167 |
| 2016/0082517 A1 * | 3/2016 | Ferguson | .................. | B23B 5/167 |
| | | | | 408/1 BD |

* cited by examiner

ROTATIONAL CUTTING TOOL FOR TRIMMING WORKPIECE

BACKGROUND OF THE INVENTION

1. Field of the Invention

The present invention relates to a cutting tool and, particularly, to a cutting tool which is operably rotated for trimming a workpiece.

2. Description of the Related Art

Generally, it is easy to engage a screw with a nut, but it becomes difficult if the screw is corroded, or covered with dirt, or damaged. So, a screw die, which can create threads, is commonly used to trim damaged threads or to remove dirt from the screw. However, when using such screw die, it needs to be careful to avoid cutting threads which do not suffer set forth problems.

TW Pat. No. 1572433, which corresponds to U.S. Pat. No. 9,821,393, shows a cutting tool adapted for trimming a workpiece. The cutting tool is adapted to be driven by a power tool or a pneumatic tool. However, a workpiece to be trimmed can "jump" and is not contacting with the cutting tool when the power tool or the pneumatic tool drives the cutting tool fast.

The present invention is, therefore, intended to obviate or at least alleviate the problems encountered in the prior art.

SUMMARY OF THE INVENTION

According to the present invention, a rotational cutting tool which is operably rotated for trimming a work piece has a body which includes a connecting end for engaging with a driving tool and a cutting end for engaging with the work piece. The body is rotatable about a rotation axis. The connecting end and the cutting end rotate about the rotation axis upon rotation of the body. An inner periphery of the cutting end defines a receiving space for receiving the work piece. The receiving space has a conic surface which extends radially and obliquely with respect to the rotation axis. The receiving space includes a first ridge forming at least one cutting edge for trimming the workpiece and at least one slot allowing trimmed pieces from the workpiece to exit from the receiving space. The first cutting edge extends radially and obliquely with respect to the rotation axis. The first cutting edge extends curvedly and has a curved contour.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

It is an objective of the present invention that the rotational cutting tool neither unduly truncates the threaded fastener nor eliminates numbers of threads.

It is yet another objective of the present invention that the rotational cutting tool gets rid of trimmed pieces from the thread fastener easily and quickly.

It is yet another objective of the present invention that the rotational cutting tool avoids the trouble of alignment as set forth.

Other objectives, advantages, and new features of the present invention will become apparent from the following detailed description of the invention when considered in conjunction with the accompanied drawings.

DETAILED DESCRIPTION OF THE INVENTION

Figure 1:
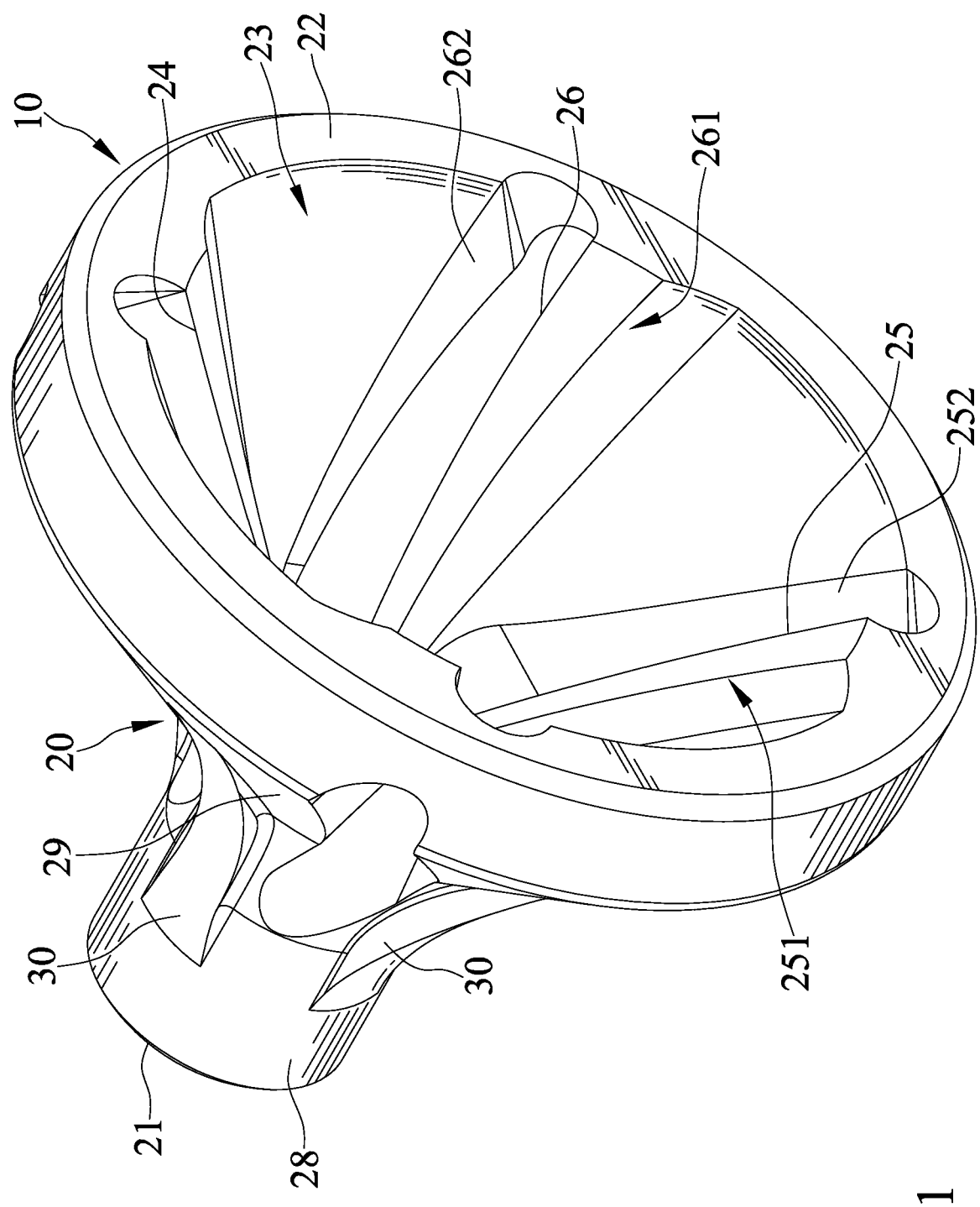
FIG. 1 is a perspective view of a rotational cutting tool in accordance with a first embodiment of the present invention.
Figure 2:
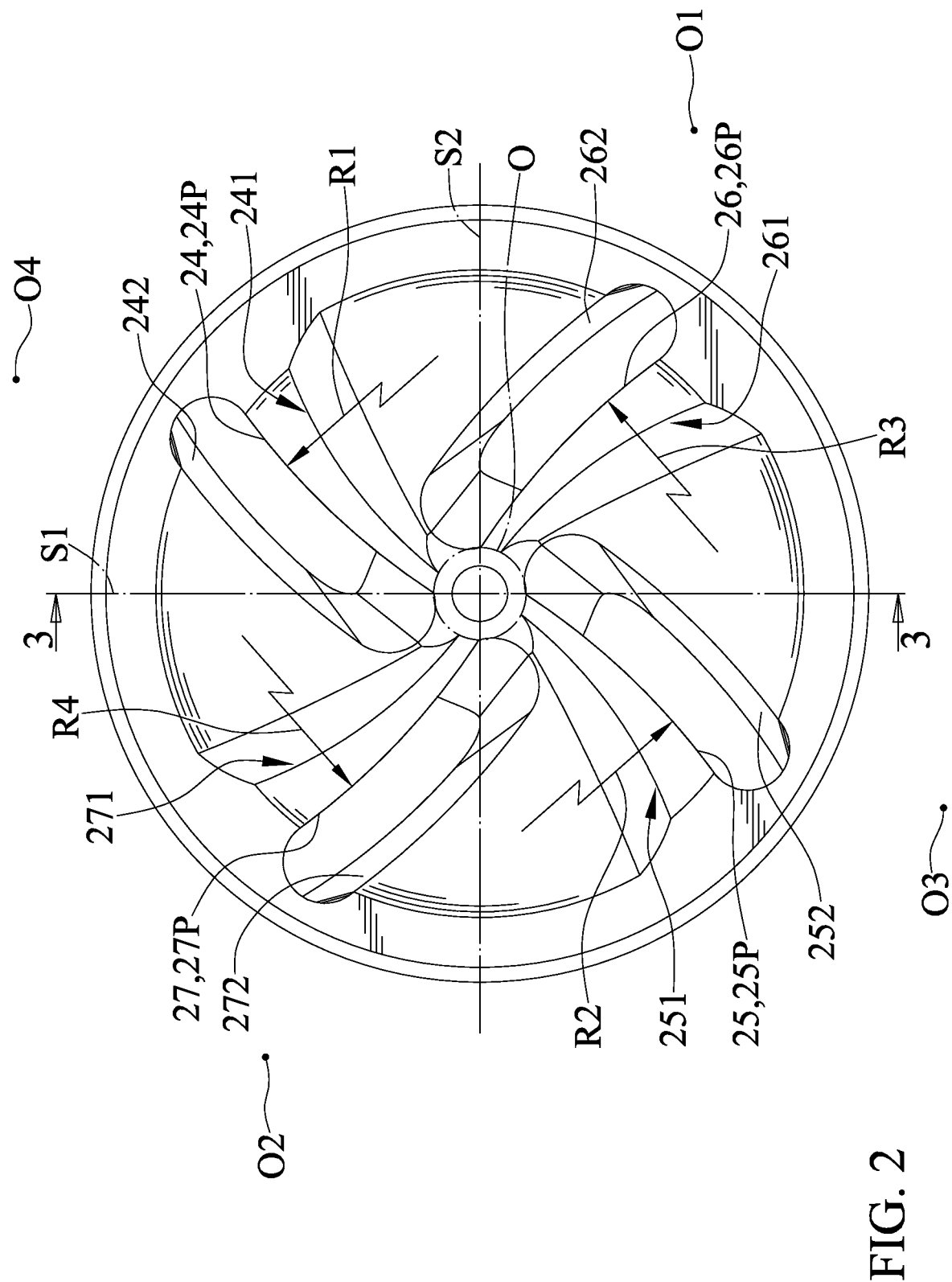
FIG. 2 is a top view of the rotational cutting tool of FIG. 1.
Figure 3:
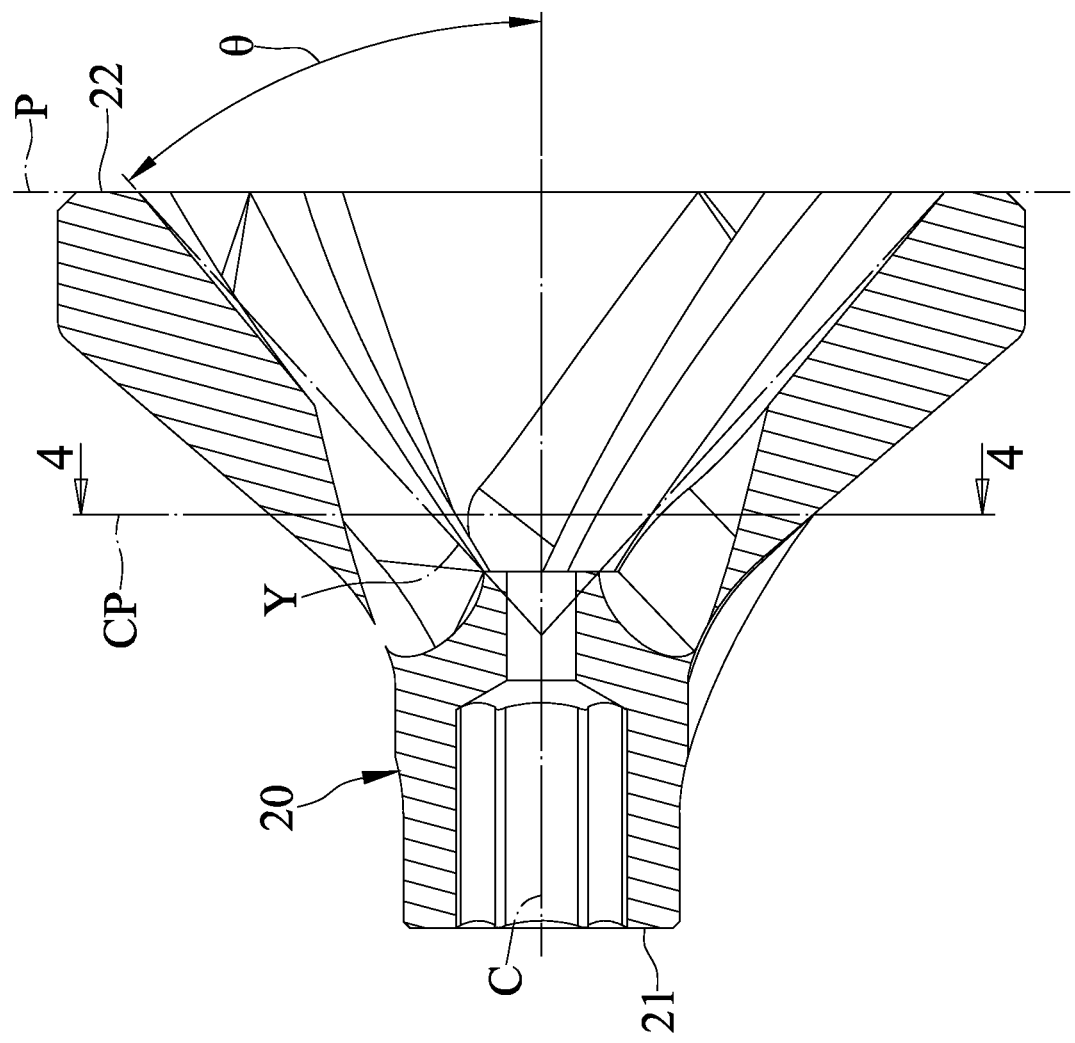
FIG. 3 is a cross-sectional view of the rotational cutting tool taken along line 3-3 of FIG. 2.
Figure 4:
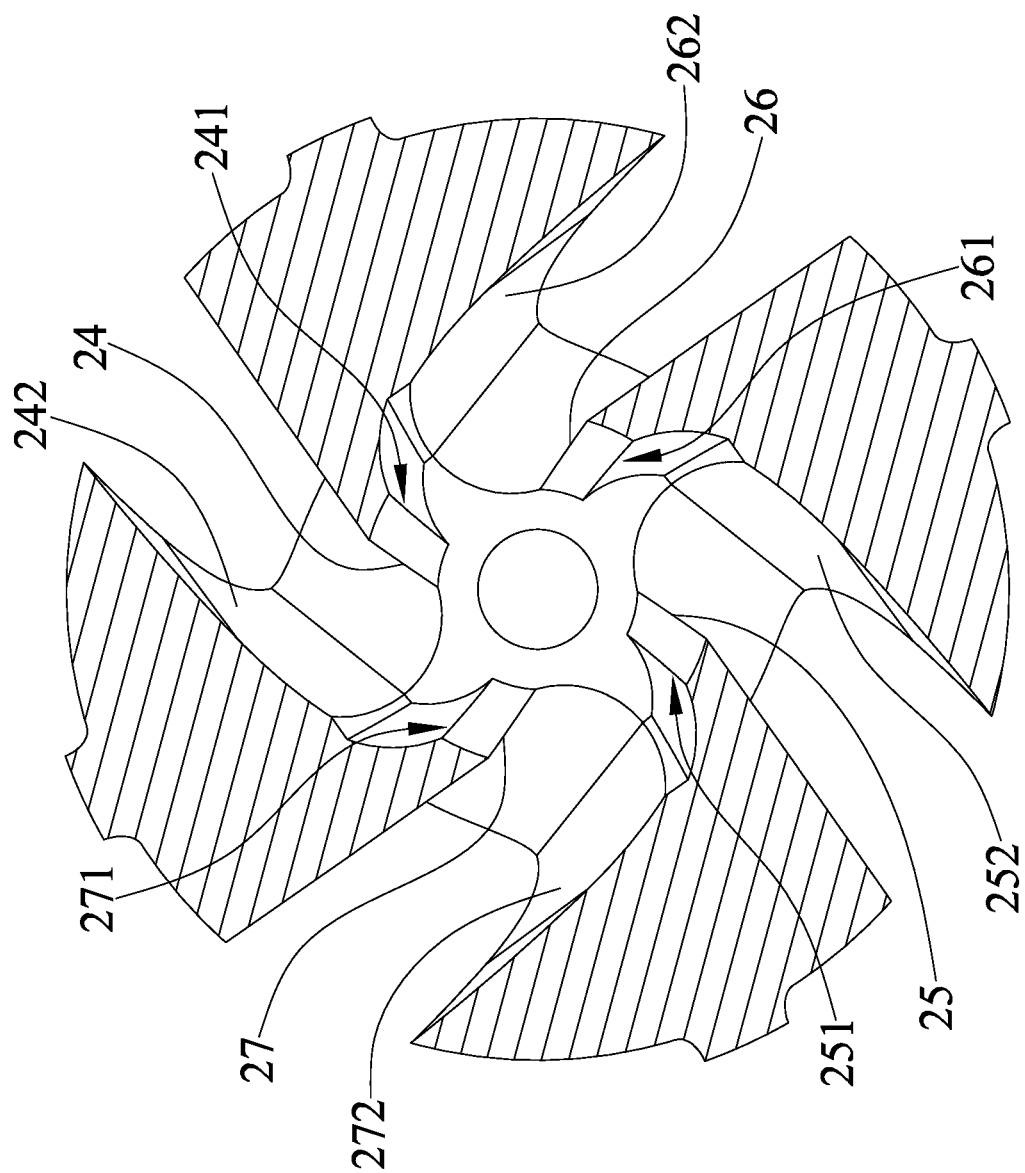
FIG. 4 is a cross-sectional view of the rotational cutting tool taken along line 4-4 of line 4-4 of FIG. 3.

FIGS. 1 through 5 show a rotational cutting tool 10 which is operably rotated for trimming a workpiece in accordance with a first embodiment of the present invention.

The rotational cutting tool 10 has a body 20. The body 20 is a one-piece structure. The body 20 includes a connecting end 21 for engaging with a driving tool 90 and a cutting end 22 for engaging with the work piece.

The body 20, in cross section, has a straight section 28 and a conic section 29. The straight section 28 and the conic section 29 respectively form the connecting end 21 and the cutting end 22. The body 20 is rotatable about a rotation axis C. The connecting end 21 and the cutting end 22 rotate about the rotation axis C upon rotation of the body 20.

An inner periphery of the cutting end 22 defines a receiving space 23 for receiving the work piece. The receiving space 23 has a conic surface which extends radially and obliquely with respect to the rotation axis C. The receiving space 23 has a top and a bottom and tapers outwardly from the top to the bottom. The receiving space 23 includes an annular opening at the bottom. The workpiece to be trimmed by the rotational cutting tool 10 can insert into the receiving space 23 through the opening of the receiving space 23.

The receiving space 23 includes a first ridge forming at least one cutting edge for trimming the workpiece. The at least one cutting edge extends radially and obliquely with respect to the rotation axis C. The at least one cutting edge extends curvedly and has a curved contour. In the embodiment, the at least one cutting edge includes a first cutting edge 24, a second cutting edge 25, a third cutting edge 26, and a fourth cutting edge 27.

The first cutting edge 24 extends on an axis Y. The axis Y is offset at an angle θ with respect to the rotation axis C. The angle θ is in a range between 20 degrees and 60 degrees. The first cutting edge 24 projecting on a projection plane P which is perpendicular to the rotation axis C has a projection of the first cutting edge 24P. The projection of the first cutting edge 24P is a curved line. The projection of the first cutting edge 24P has a center of curvature at a first center O1 which is located outside the body 20. The projection of the first cutting edge 24P is at a first radius R1 from the first center O1. The first radius R1 is in a range between 20 mm and 50 mm. The projection of the first cutting edge 24P extends from a first point on a circumference of a circle O. The circle O has a diameter in a range between 1 mm to 20 mm. A first datum line S1 passes the first point and the rotation axis C. The first center O1 is at a distance from the first datum line S1 in a range between 20 mm to 40 mm. Preferably, the first center O1 is at a distance from the first datum line S1 in a range between 25 mm to 35 mm. A second datum line S2 is perpendicular to the first datum line S1 and passes the rotation axis C. The first center O1 is at a distance from the second datum line S2 in a range between 10 mm to 25 mm. The first cutting edge 24 intersects a cut plane CP at a first intersection. The cut plane CP is perpendicular to the rotation axis C. The first intersection is spaced from the rotation axis C at a first distance. The surface of the receiving space 23 intersects the cut plane CP at intersections which are spaced from the rotation axis C at distances longer than the first distance.

The second cutting edge 25 projecting on the projection plane P has a projection of the second cutting edge 25P. The projection of the second cutting edge 25P is a curved line. The projection of the second cutting edge 25P has a center of curvature at a second center O2 which is located outside the body 20. The projection of the second cutting edge 25P is at a second radius R2 from the second center O2. The second radius R2 is in a range between 20 mm and 50 mm. The projection of the second cutting edge 25P extends from a second point on the circumference of a circle O. The first datum line S1 passes the second point. The second center O2 is at a distance from the first datum line S1 in a range between 20 mm to 40 mm. Preferably, the second center O2 is at a distance from the first datum line S1 in a range between 25 mm to 35 mm. The second center O2 is at a distance from the second datum line S2 in a range between 10 mm to 25 mm. The second cutting edge 25 intersects the cut plane CP at a second intersection. The second intersection is spaced from the rotation axis C at a second distance. The intersections of the surface of the receiving space 23 on the cut plane CP are spaced from the rotation axis C at distances longer than the second distance.

The third cutting edge 26 projecting on the projection plane P has a projection of the third cutting edge 26P. The projection of the third cutting edge 26P is a curved line. The projection of the third cutting edge 26P has a center of curvature at a third center O3 which is located outside the body 20. The projection of the third cutting edge 26P is at a third radius R3 from the third center O3. The third radius R3 is in a range between 20 mm and 50 mm. The projection of the third cutting edge 26P extends from a third point on the circumference of a circle O. The first datum line S1 passes the third point. The third center O3 is at a distance from the first datum line S1 in a range between 20 mm to 40 mm. Preferably, the third center O3 is at a distance from the first datum line S1 in a range between 25 mm to 35 mm. The third center O3 is at a distance from the second datum line S2 in a range between 10 mm to 25 mm. The third cutting edge 26 intersects the cut plane CP at a third intersection. The third intersection is spaced from the rotation axis C at a third distance. The intersections of the surface of the receiving space 23 on the cut plane CP are spaced from the rotation axis C at distances longer than the third distance.

The fourth cutting edge 27 projecting on the projection plane P has a projection of the fourth cutting edge 27P. The projection of the fourth cutting edge 27P is a curved line. The projection of the fourth cutting edge 27P has a center of curvature at a fourth center O4 which is located outside the body 20. The projection of the fourth cutting edge 27P is at a fourth radius R4 from the fourth center O4. The fourth radius R4 is in a range between 20 mm and 50 mm. The projection of the fourth cutting edge 27P extends from a fourth point on the circumference of a circle O. The first datum line S1 passes the fourth point. The fourth center O4 is at a distance from the first datum line S1 in a range between 20 mm to 40 mm. Preferably, the fourth center O4 is at a distance from the first datum line S1 in a range between 25 mm to 35 mm. The fourth center O4 is at a distance from the second datum line S2 in a range between 10 mm to 25 mm. The fourth cutting edge 27 intersects the cut plane CP at a fourth intersection. The fouth intersection is spaced from the rotation axis C at a fourth distance. The intersections of the surface of the receiving space 23 on the cut plane CP are spaced from the rotation axis C at distances longer than the fourth distance.

The receiving space 23 includes at least one slot allowing trimmed pieces from the workpiece to exit from the receiving space 23. The at least one slot extends radially and obliquely with respect to the rotation axis C. The at least one slot extends radially through the body 20. The at least one slot is disposed adjacent to the at least one cutting edge. In the embodiment, numbers of the at least one cutting edge and the at least one slot are the same. The at least one slot includes a first slot 242, a second slot 252, a third slot 262, and a fourth slot 272.

The receiving space 23 also includes at least one avoiding portion disposed adjacent to the at least one cutting edge. The at least one avoiding portion and the at least one slot are disposed on opposite sides of the at least one cutting edge. In the embodiment, the at least one avoiding portion includes a first avoiding portion 241, a second avoiding portion 251, a third avoiding portion 261, and a fourth avoiding portion 271. Further, the first avoiding portion 241 extending away from the first cutting edge 24 in a direction along a circumference of the receiving space 23 intersects the cut plane CP at intersections which are spaced from the rotation axis C at distances longer than the first distance which is the distance between the rotation axis C and the first intersection which is the intersection between the first cutting edge 24 and the cut plane CP. Further, the second avoiding portion 251 extending away from the second cutting edge 25 in a direction along the circumference of the receiving space 23 intersects the cut plane CP at intersections which are spaced from the rotation axis C at distances longer than the second distance which is the distance between the rotation axis C and the second intersection which is the intersection between the second cutting edge 25 and the cut plane CP. Further, the third avoiding portion 261 extending away from the third cutting edge 26 in a direction along the circumference of the receiving space 23 intersects the cut plane CP at intersections which are spaced from the rotation axis C at distances longer than the third distance which is the distance between the rotation axis C and the third intersection which is the intersection between the third cutting edge 26 and the cut plane CP. Further, the fourth avoiding portion 271 extending away from the fourth cutting edge 27 in a direction along the circumference of the receiving space 23 intersects the cut plane CP at intersections which are spaced from the rotation axis C at distances longer than the fourth distance which is the distance between the rotation axis C and the fourth intersection which is the intersection between the fourth cutting edge 27 and the cut plane CP.

The body 20 includes at least one rib 30 extending from an outer periphery of the connecting end 21 to an outer periphery of the cutting end 22. The at least one rib 30 reinforces the structural strength of the body 20.

Figure 5:
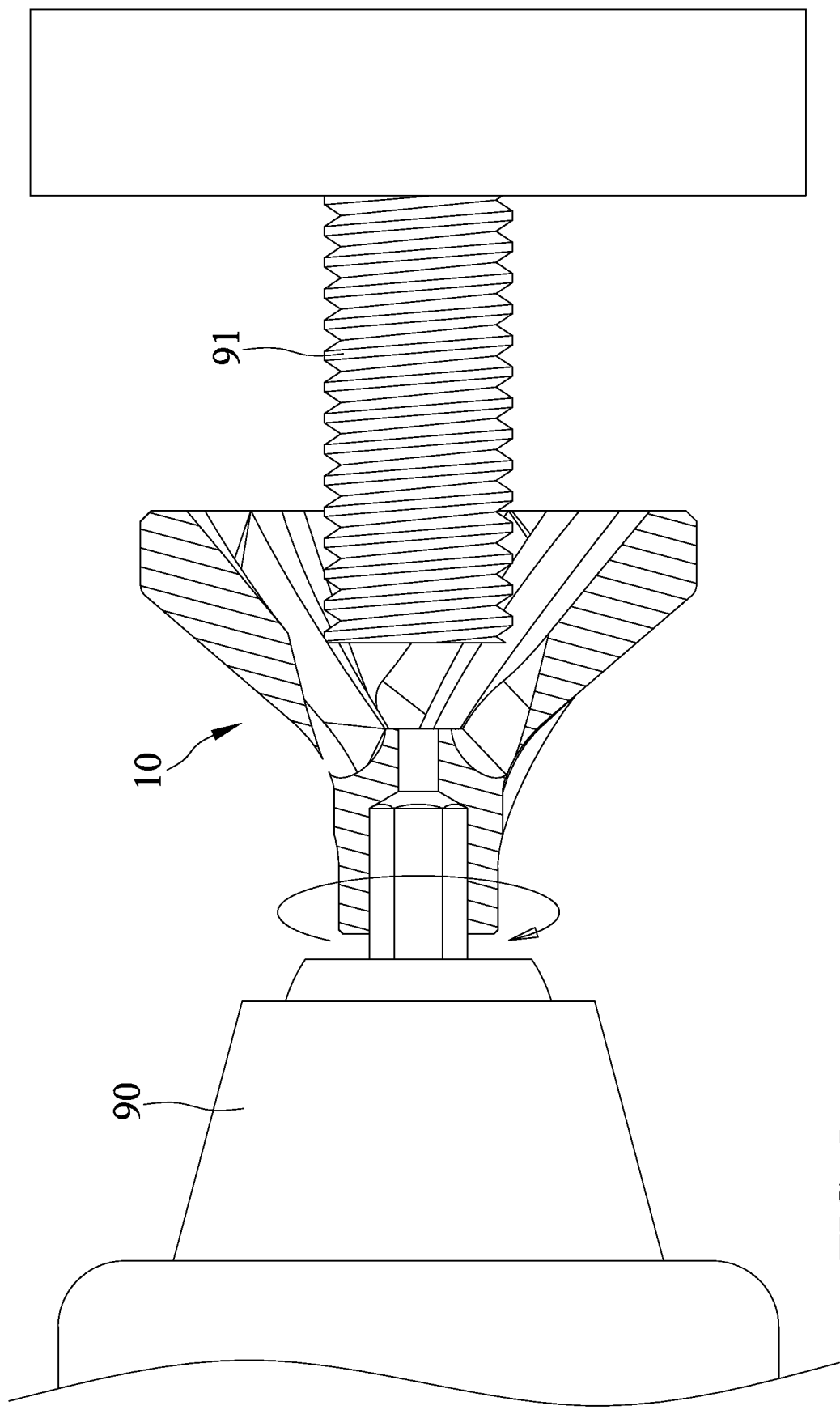
FIG. 5 illustrates the rotational cutting tool of FIG. 1 being operated to trim a workpiece.
Figure 6:
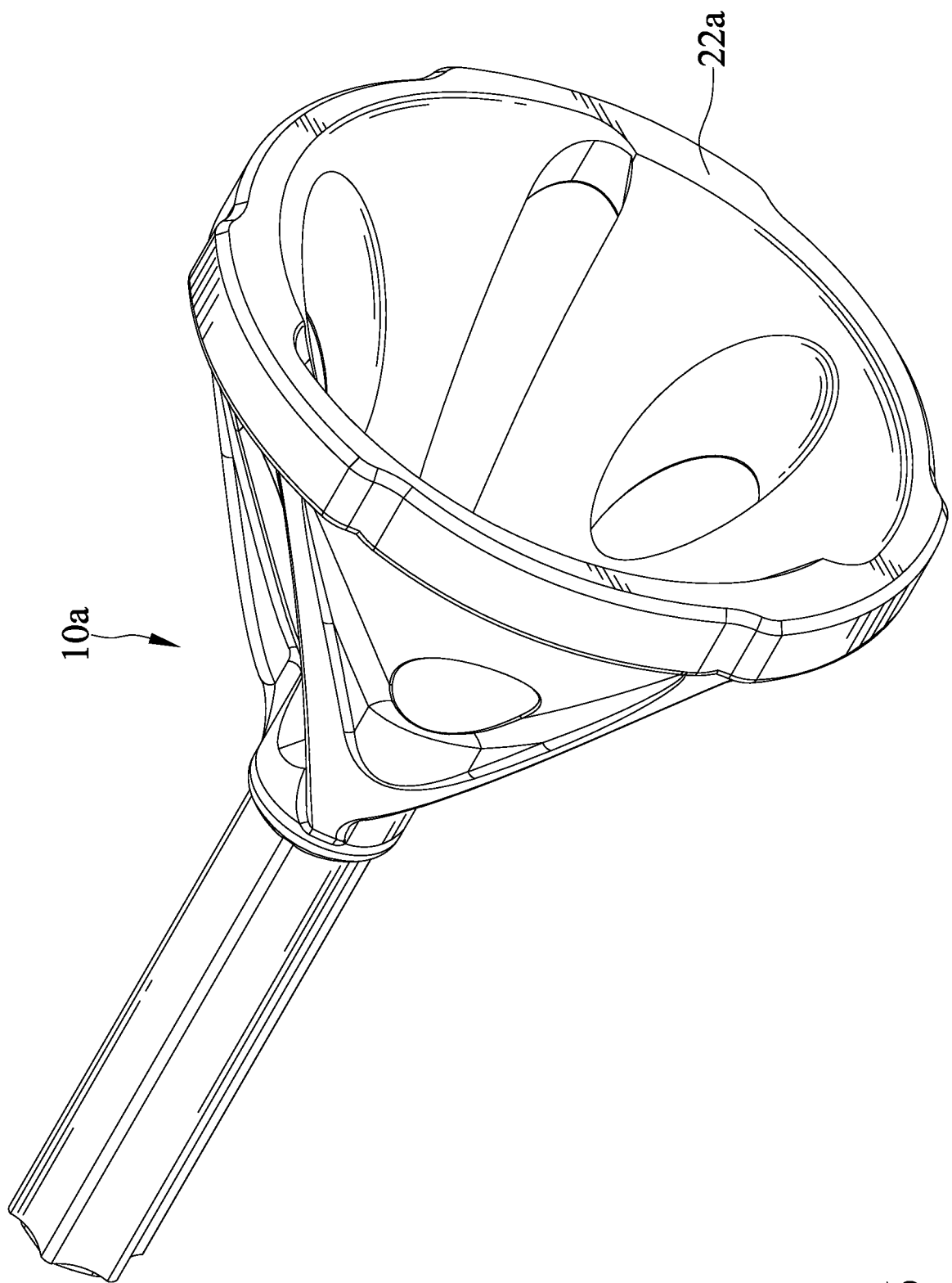
FIG. 6 is a perspective view of a rotational cutting tool in accordance with a second embodiment of the present invention.
Figure 7:
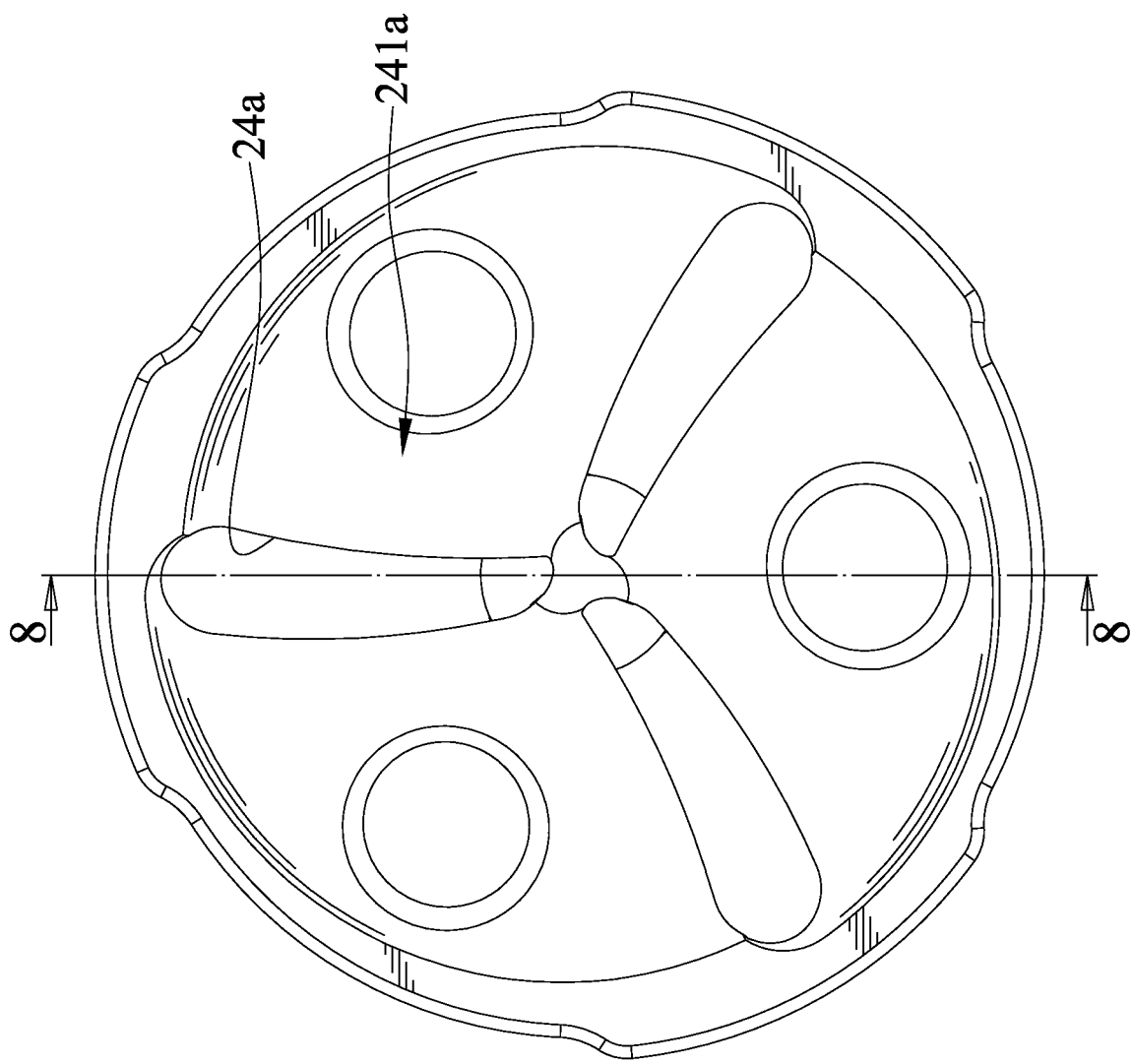
FIG. 7 is a top view of the rotational cutting tool of FIG. 6.
Figure 8:
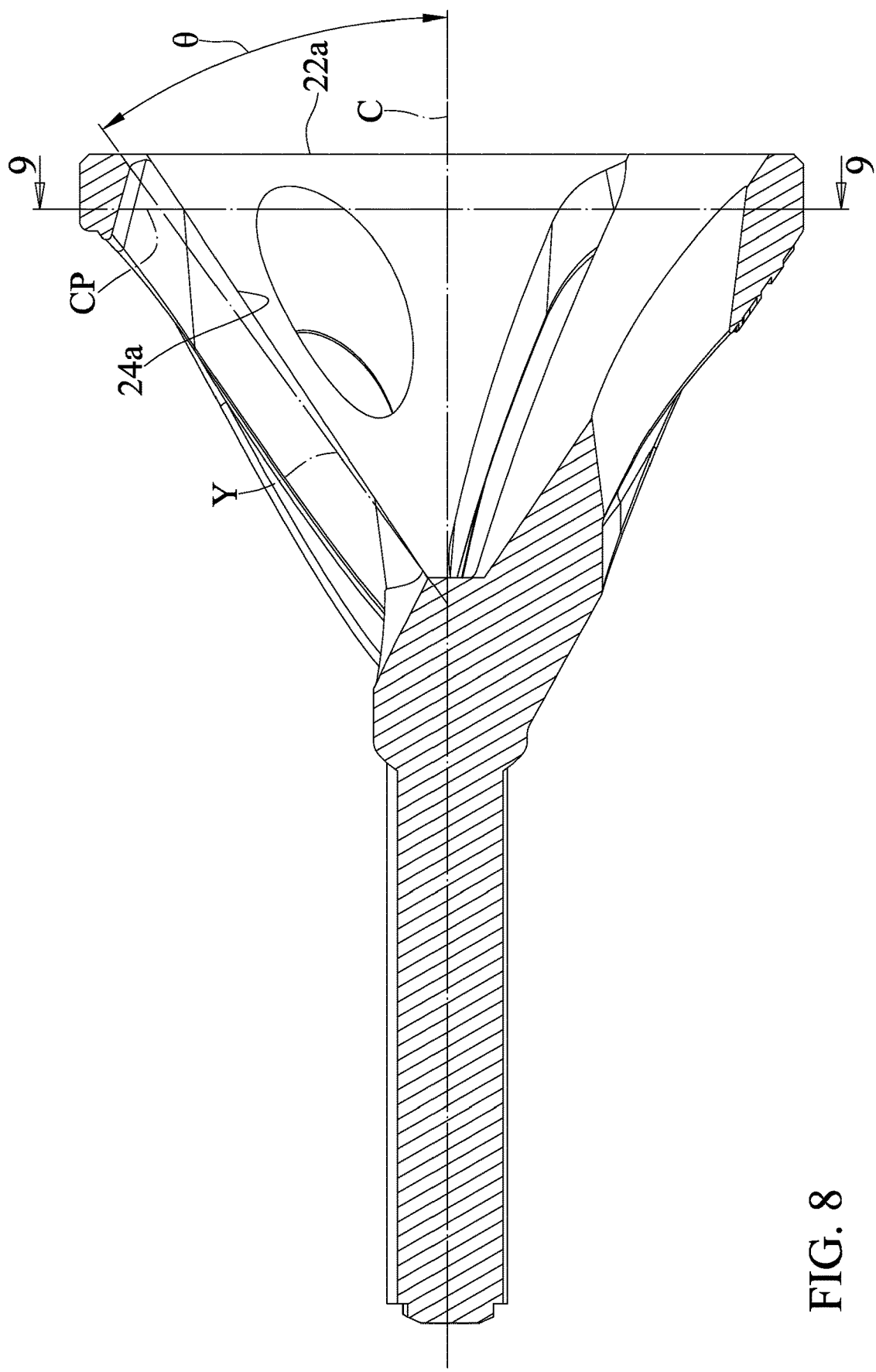
FIG. 8 is a cross-sectional view of the rotational cutting tool taken along line 8-8 of FIG. 7.
Figure 9:
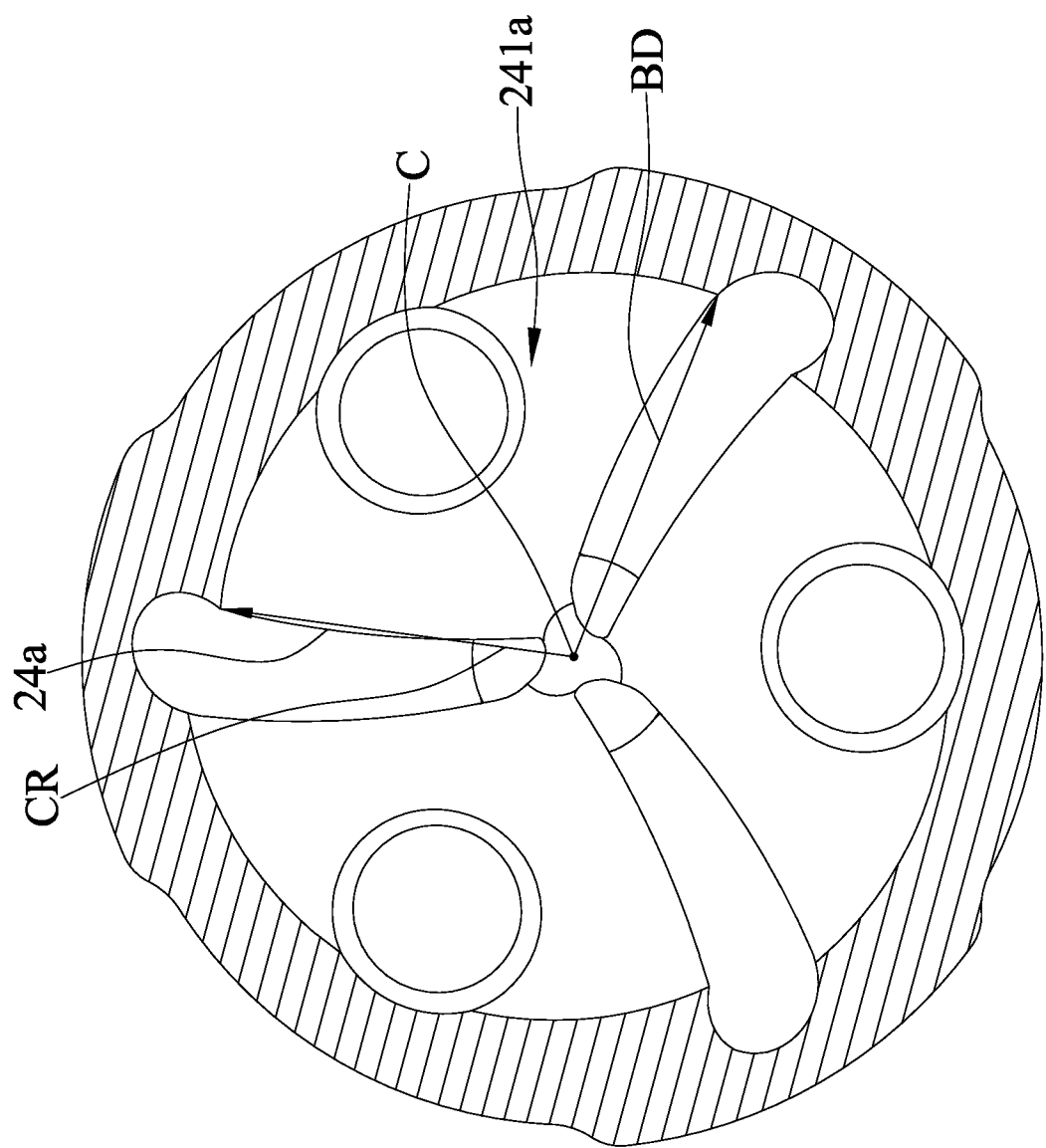
FIG. 9 is a cross-sectional view of the rotational cutting tool taken along line 9-9 of FIG. 8.

FIG. 5 shows that the rotational cutting tool 10 trimming a threaded fastener 91. The receiving space 23 in the cutting end 22 receives an end of the threaded fastener 91. The rotational cutting tool 10 is rotated. The at least one cutting edge 24 trims the threaded fastener 91. The trimmed pieces experience a centrifugal force inside the receiving space 23 and exit from the body 20 through the at least one slot 26. The rotational cutting tool 10 can be driven by a driving tool 90. Preferably, the driving tool 90 is a power tool.

The rotational cutting tool 10 is prevented from unduly truncating the threaded fastener 91 and eliminating numbers of threads, so the angle θ is in a range between 20 degrees and 60 degrees.

FIGS. 6 through 9 show a rotational cutting tool 10a in accordance with a second embodiment of the present invention, and the same numbers are used to correlate similar components of the first embodiment, but bearing a letter a. The rotational cutting tool 10a differentiates from the rotational cutting tool 10 in that a back distance BD, which measures a distance from the rotation axis C to a distal end of an avoiding portion 241a of a cutting end 22a which is distal to the rotation axis C and with which a cut plane CP intersects, is at least 1.05 times of a radius of cutting edge CR, which measures a distance from the rotation axis C to a distal end of a first cutting edge 24a of the cutting end 22a which is distal to the rotation axis C and with which the cut plane CP intersects. In the embodiment, the back distance BD is 1.08 times of the radius of cutting edge CR.

It is appreciated that when the rotational cutting tool 10a driven by the driving tool 90 rotates fast, avoiding portions 241a will not abrade a workpiece to be trimmed easily. Further, the cutting end 22a of the rotational cutting tool 10a is adapted to trim a thick workpiece at a quick speed than conventional rotation cutting tools.

In view of the forgoing, it is appreciated that frictional resistance between the cutting edges 24, 24a, 25, 26, and 27 and a work piece to be trimmed is substantially decreased which effectively prevents the "jump" problem as discussed in the description of the related and prevents damage of the workpiece.

Further, the rotational cutting tools 10 and 10a are adapted to trim the threaded fastener 91 without unduly eliminating numbers of threads. The slots 242, 252, 262, and 272 allow the cutting tool 10 to get rid of the trimmed pieces easily and quickly.

The foregoing is merely illustrative of the principles of this invention and various modifications can be made by those skilled in the art without departing from the scope and spirit of the invention.

What is claimed is:

1. A rotational cutting tool which is operably rotated for trimming a workpiece comprising:
a body including a connecting end for engaging with a driving tool and a cutting end for engaging with the workpiece, wherein the body is rotatable about a rotation axis, wherein the connecting end and the cutting end rotate about the rotation axis upon rotation of the body, wherein an inner periphery of the cutting end defines a receiving space for receiving the workpiece, wherein the receiving space has a conic surface which extends radially and obliquely with respect to the rotation axis, wherein the receiving space includes a first ridge forming at least one cutting edge for trimming the workpiece, wherein the at least one cutting edge extends radially and obliquely with respect to the rotation axis, and wherein the at least one cutting edge extends curvedly and has a curved contour.

2. The rotational cutting tool as claimed in claim 1, wherein the at least one cutting edge extends on an axis, wherein the axis is offset at an angle with respect to the rotation axis, and wherein the angle is in a range between 20 degrees and 60 degrees.

3. The rotational cutting tool as claimed in claim 2, wherein the at least one cutting edge projecting on a projection plane which is perpendicular to the rotation axis has a projection of the at least one cutting edge, wherein the projection of the at least one cutting edge is a curved line, wherein the projection of the at least one cutting edge has a center of curvature at a first center which is located outside the body, wherein the projection of the at least one cutting edge is at a first radius from the first center, and wherein the first radius is in a range between 20 mm and 50 mm.

4. The rotational cutting tool as claimed in claim 3, wherein the projection of the at least one cutting edge extends from a point on a circumference of a circle, wherein the circle has a diameter in a range between 1 mm to 20 mm, wherein a first datum line passes the first end and the rotation axis, wherein the first center is at a distance from the first datum line in a range between 20 mm to 40 mm, wherein a second datum line is perpendicular to the first datum line and passes the rotation axis, and wherein the first center is at a distance from the second datum line in a range between 10 mm to 25 mm.

5. The rotational cutting tool as claimed in claim 4, wherein the first center is at a distance from the first datum line S1 in a range between 25 mm to 35 mm.

6. The rotational cutting tool as claimed in claim 4, wherein the at least one slot extends radially and obliquely with respect to the rotation axis, wherein the at least one slot extends radially through the body, and wherein the at least one slot is disposed adjacent to the at least one cutting edge.

7. The rotational cutting tool as claimed in claim 6, wherein the at least one cutting edge intersects a cut plane at a first intersection, wherein the cut plane is perpendicular to the rotation axis, wherein the first intersection is spaced from the rotation axis at a first distance, and wherein the surface of the receiving space intersects the cut plane at intersections which are spaced from the rotation axis at distances longer than the first distance.

8. The rotational cutting tool as claimed in claim 7, wherein the receiving space includes at least one avoiding portion disposed adjacent to the at least one cutting edge, wherein the at least one avoiding portion and the at least one slot are disposed on opposite sides of the at least one cutting edge, and wherein the at least one avoiding portion extending away from the at least one cutting edge in a direction along a circumference of the receiving space intersects the cut plane at intersections which are spaced from the rotation axis at distances longer than the first distance.

9. The rotational cutting tool as claimed in claim 8, wherein the body includes at least one rib extending from an outer periphery of the connecting end to an outer periphery of the cutting end.

10. The rotational cutting tool as claimed in claim 9, wherein the back distance is 1.08 times of the radius of cutting edge.

11. The rotational cutting tool as claimed in claim 1, wherein the receiving space includes at least one slot allowing trimmed pieces from the workpiece to exit from the receiving space, wherein the at least one slot extends radially and obliquely with respect to the rotation axis, wherein the at least one slot extends radially through the body, and wherein the at least one slot is disposed adjacent to the at least one cutting edge.

12. The rotational cutting tool as claimed in claim 11, wherein numbers of the at least one cutting edge and the at least one slot are the same.

13. The rotational cutting tool as claimed in claim 1, wherein the at least one cutting edge intersects a cut plane at a first intersection, wherein the cut plane is perpendicular to the rotation axis, wherein the first intersection is spaced from the rotation axis at a first distance, and wherein the surface of the receiving space intersects the cut plane at intersections which are spaced from the rotation axis at distances longer than the first distance.

14. The rotational cutting tool as claimed in claim 13, wherein the receiving space includes at least one avoiding portion disposed adjacent to the at least one cutting edge, wherein the at least one avoiding portion and the at least one slot are disposed on opposite sides of the at least one cutting edge, and wherein the at least one avoiding portion extending away from the at least one cutting edge in a direction along a circumference of the receiving space intersects the cut plane at intersections which are spaced from the rotation axis at distances longer than the first distance.

15. The rotational cutting tool as claimed in claim 14, wherein the cutting end has a radius of cutting edge measuring a distance from the rotation axis to a distal end of the at least one cutting edge which is distal to the rotation axis, wherein the body has a back distance measuring a distance from the rotation axis to a distal end of the at least one avoiding portion which is distal to the rotation axis, and wherein the back distance is at least 1.05 times of the radius of cutting edge.

16. The rotational cutting tool as claimed in claim 14, wherein the cutting end has a radius of cutting edge measuring a distance from the rotation axis to a distal end of the at least one cutting edge which is distal to the rotation axis, wherein the body has a back distance measuring a distance from the rotation axis to a distal end of the at least one avoiding portion which is distal to the rotation axis, and wherein the back distance is at least 1.05 times of the radius of cutting edge.

17. The rotational cutting tool as claimed in claim 16, wherein numbers of the at least one cutting edge and the at least one slot are the same.

18. The rotational cutting tool as claimed in claim 1, wherein the body includes at least one rib extending from an outer periphery of the connecting end to an outer periphery of the cutting end.

19. The rotational cutting tool as claimed in claim 1, wherein the body, in cross section, has a straight section and a conic section, and wherein the straight section and the conic section respectively form the connecting end and the cutting end.

* * * * *